(12) United States Patent
Calvignac et al.

(10) Patent No.: US 6,370,148 B1
(45) Date of Patent: Apr. 9, 2002

(54) DATA COMMUNICATIONS

(75) Inventors: Jean Calvignac, Cary, NC (US);
Daniel Orsatti, Cagnes-sur-mer (FR);
Fabrice Verplanken, Cary, NC (US);
Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/110,920

(22) Filed: Jul. 6, 1998

(51) Int. Cl.$^7$ .................................................. H04J 3/14
(52) U.S. Cl. ...................................... 370/412; 370/462
(58) Field of Search ................................ 370/412, 413, 370/414, 415, 416, 417, 418, 422, 423, 424, 428, 429, 431, 462, 389, 392

(56) References Cited

U.S. PATENT DOCUMENTS

| | | | | |
|---|---|---|---|---|
| 5,267,235 A | * | 11/1993 | Thacker | 370/396 |
| 5,391,401 A | * | 2/1995 | Barucci et al. | 709/225 |
| 5,463,624 A | * | 10/1995 | Hogg et al. | 370/461 |
| 5,500,858 A | * | 3/1996 | McKeown | 370/412 |
| 6,160,812 A | * | 12/2000 | Bauman et al. | 370/416 |

* cited by examiner

Primary Examiner—Huy D. Vu
(74) Attorney, Agent, or Firm—Scott W. Reid

(57) ABSTRACT

An improved arbiter is described for arbitrating requests by a plurality of first data processing units for access to a plurality of second data processing units interconnected by a switching system of a type in which at any time each first unit can only access one second unit and each second unit can only be accessed by one first unit. The arbiter comprises a scheduler mechanism for repeatedly selecting access requests with a defined minimum probability of selecting a request for each first unit-second unit combination. Rearrangement storage means records requests selected by the scheduler mechanism. A rearranger is provided for repeatedly selecting a set of requests recorded in the rearrangement storage means, so that only one request per first unit and per second unit is selected, using a priority mechanism which increases the probability of selection with the length of time a request is stored in the rearrangement storage means. Finally, means are provided for communicating the grant of the selected set of requests to the switching system and for deleting the selected set of requests from the rearrangement storage means. In one embodiment, the arbiter is used for controlling switching paths in a packet data switch.

7 Claims, 5 Drawing Sheets

FIG. 5

Step 1

|   | A | B | C | D |
|---|---|---|---|---|
| a | 1 | 1 |   |   |
| b |   | 3 |   |   |
| c |   |   | 5 | 2 |
| d | 2 |   |   | 1 |

340 Rearrangement Matrix

Step 2

|   | A | B | C | D |
|---|---|---|---|---|
| a | 1 | 1 |   |   |
| b |   | 3 |   |   |
| c |   |   | 5 | 2 |
| d | 2 |   |   | 1 |

Step 3

|   | A | B | C | D |
|---|---|---|---|---|
| a | 1 | 1 |   |   |
| b |   | 3 |   |   |
| c |   |   | 5 | 2 |
| d | 2 |   |   | 1 |

Step 4

|   | A | B | C | D |
|---|---|---|---|---|
| a | 1 | 1 |   |   |
| b |   | 3 |   |   |
| c |   |   | 5 | 2 |
| d | 2 |   |   | 1 |

DATA COMMUNICATIONS

BACKGROUND OF THE INVENTION

1. Field of the Invention

This invention relates to data communications and, more specifically, to an arbiter which finds particular, but not exclusive, application in scheduling connections within a packet data switch of the space-division type.

2. Background Description

The provision of high speed switching devices is vital to modern packet switched data communications systems, such as those based on Asynchronous Transfer Mode (ATM) technology.

Many types of switching architectures have been proposed and/or implemented in high speed switches. A general review of such architectures can be found in TOBAGI 'Fast Packet Switch Architectures for Broadband Integrated Services Digital Networks' Proc IEEE Vol 78, No 1, pp 133–167, (1990).

In space-division type switch architectures, multiple concurrent paths are established from a plurality of inputs to a plurality of outputs, each path only being required to operate at the same data rate as an individual input or output line. One problem with this type of switch architecture is that it is generally not possible for all the required paths from each input to each output to be set simultaneously. This has the result that if two data packets arrive simultaneously at the same input and/or destined for the same output then the passage of such data packets through the switch has to be scheduled so that one of the packets must wait in some kind of buffer or queue.

Various types of queuing and buffering arrangements have been proposed, examples of which can be found in the above mentioned article.

In one possible buffering arrangement, a set of queues are placed at the inputs to the switch and data packets are transferred from the input queues to the output ports when the required input-output connection can be established in the switch. Such so-called input-queued switches require a controller or arbiter which is capable of selecting that subset of input-output combinations which can be simultaneously connected and which maximises the utilization of the output ports.

U.S. Pat. No. -5,267,235 and U.S. Pat No. 5,500,858 describe scheduling arrangements for input-queued space-division switches which provide a match between requesters, ie the input adapters of a switch, that must arbitrate for service from one of a number of servers, ie the output adapters of a switch. Each requester presents a set of requests. Requests are presented to all servers to which access is desired. Each server selects one such request and asserts a response signal stating the request selected. Each requester then selects one incoming grant response and deasserts requests to any other servers. Several iterations are performed to try to maximise the number of requests selected. In U.S. Pat. No. 5,267,235 it is proposed that the servers select requests on a random or pseudo random basis. U.S. Pat. No. 5,500,858 proposes a rotating priority approach for selection of requests by the servers and subsequently of a grant response by the requesters.

U.S. Pat. No. 5,392,401 describes an input-queued switch in which a scheduling algorithm operating on a request matrix is used in order to select input-output pairs. The algorithm operates on each matrix row in turn and selects an input-output pair with the the rule that the same input-output pair is not selected if it was selected for that row in the last iteration. Such a structure is relatively simple to implement, but the scheduling algorithm described is not optimal.

The problem in the design of scheduling algorithms of the above type is to balance the requirement for maximum switch throughput and the need to ensure that the scheduling of the switching paths is fair in the sense that, whatever the input traffic pattern, the amount of traffic allowed to pass through any particular input-output path must receive at least a defined share of the bandwidth on the respective input or output path. This is particularly important in the presence of ATM non-reserved bandwidth (NRB) traffic which can be extremely bursty.

SUMMARY OF THE INVENTION

It is an object of the present invention to provide a packet data switch of the space division type with a scheduling arrangement which is capable of handling bursty traffic with improved fairness, whilst maintaining switch throughput.

In brief, this is achieved by the provision of an improved arbiter for arbitrating requests by a plurality of first data processing units for access to a plurality of second data processing units interconnected by a switching system of a type in which at any time each first unit can only access one second unit and each second unit can only be accessed by one first unit.

The arbiter comprises a scheduler mechanism for repeatedly selecting access requests with a defined minimum probability of selecting a request for each first unit-second unit combination. Rearrangement storage means records requests selected by the scheduler mechanism.

A rearranger is provided for repeatedly selecting a set of requests recorded in the rearrangement storage means, so that only one request per first unit and per second unit is selected, using a priority mechanism which increases the probability of selection with the length of time a request is stored in the rearrangement storage means. Finally, means are provided for communicating the grant of the selected set of requests to the switching system and for deleting the selected set of requests from the rearrangement storage means.

Thus, a two-stage mechanism has been devised in which in a first stage, a scheduler is used which is fair, but which does not necessarily remove all possible input-output contention. Any contention between the input-output combinations selected by the first scheduler is resolved in a second stage by a rearranger operating on intermediate rearrangement storage which records the requests selected by the scheduler. Since the algorithm in the scheduler is not required to resolve all contention on the input and output lines, it can maintain high throughput as well as being fair. However, it nevertheless acts to reduce contention so that the subsequent resolution in the rearranger of any remaining input or output conflicts has a relatively low impact on the switch throughput.

Whilst the above described arbiter has been developed for use in controlling switching paths in a packet data switch, the possibility is not excluded that the above measures be applied in other contexts which have a similar resource arbitration requirement.

To avoid the possibility that a request remain indefinitely in the rearrangement storage, the priority mechanism in the rearranger is such as to guarantee that each request recorded in the rearrangement storage is eventually selected. This is achieved if the priority mechanism is based at least in part on the length of time any particular request has been stored in the rearrangement storage. In one embodiment, an age indicator associated with each request is stored with the request in the first storage means and the priority mechanism in the rearranger is based at least in part on the age indicator.

In a preferred embodiment, the scheduler mechanism comprises a plurality of first schedulers, one for each first unit, for repeatedly selecting one request for access by the respective first unit with a defined minimum probability of selecting a request from that first unit to access each second unit; and a plurality of second schedulers, one for each second unit, for repeatedly selecting one of the requests for access to the respective second unit with a defined minimum probability of selecting a request from each first unit to access that second unit. Requests selected by both one of the first schedulers and one of the second schedulers are recorded in the rearrangement storage means.

Second storage means can be provided for recording the request selected by the first or second schedulers and the second or first schedulers, as the case may be, can be arranged to select requests from among those stored in the second storage means.

Preferably, the first schedulers and/or the second scheduler use a rotating priority, although other priority schemes such as a random selection may be possible in some implementations. Particularly effective is the double round robin arrangement in which both the first schedulers and the second schedulers use a rotating priority.

Also provided is packet data switch apparatus including a cross-bar switch fabric and an arbiter as described above arranged to schedule the passage of data packets from a set of input queues through the switch.

Viewed from another aspect, the invention provides a method for arbitrating requests by a plurality of first data processing units for access to a plurality of second data processing units interconnected by a switching system of a type in which at any time each first unit can only access one second unit and each second unit can only be accessed by one first unit, the method comprising repeatedly: selecting access requests with a defined minimum probability of selecting a request for each first unit-second unit combination; recording the selected requests in rearrangement storage means; selecting a set of requests recorded in the rearrangement storage means, so that only one request per first unit and per second unit is selected, using a priority mechanism which increases the probability of selection with the length of time a request is stored in the rearrangement storage means; communicating the grant of the selected set of requests to the switching system; and deleting the selected set of requests from the rearrangement storage means.

BRIEF DESCRIPTION OF THE DRAWINGS

The foregoing and other objects, aspects and advantages will be better understood from the following detailed description of a preferred embodiment of the invention with reference to the drawings, in which:

FIGS. 4 and 5 illustrate the operation of selection algorithms within the arbiter.

DETAILED DESCRIPTION OF PREFERRED EMBODIMENTS OF THE INVENTION

Figure 1:
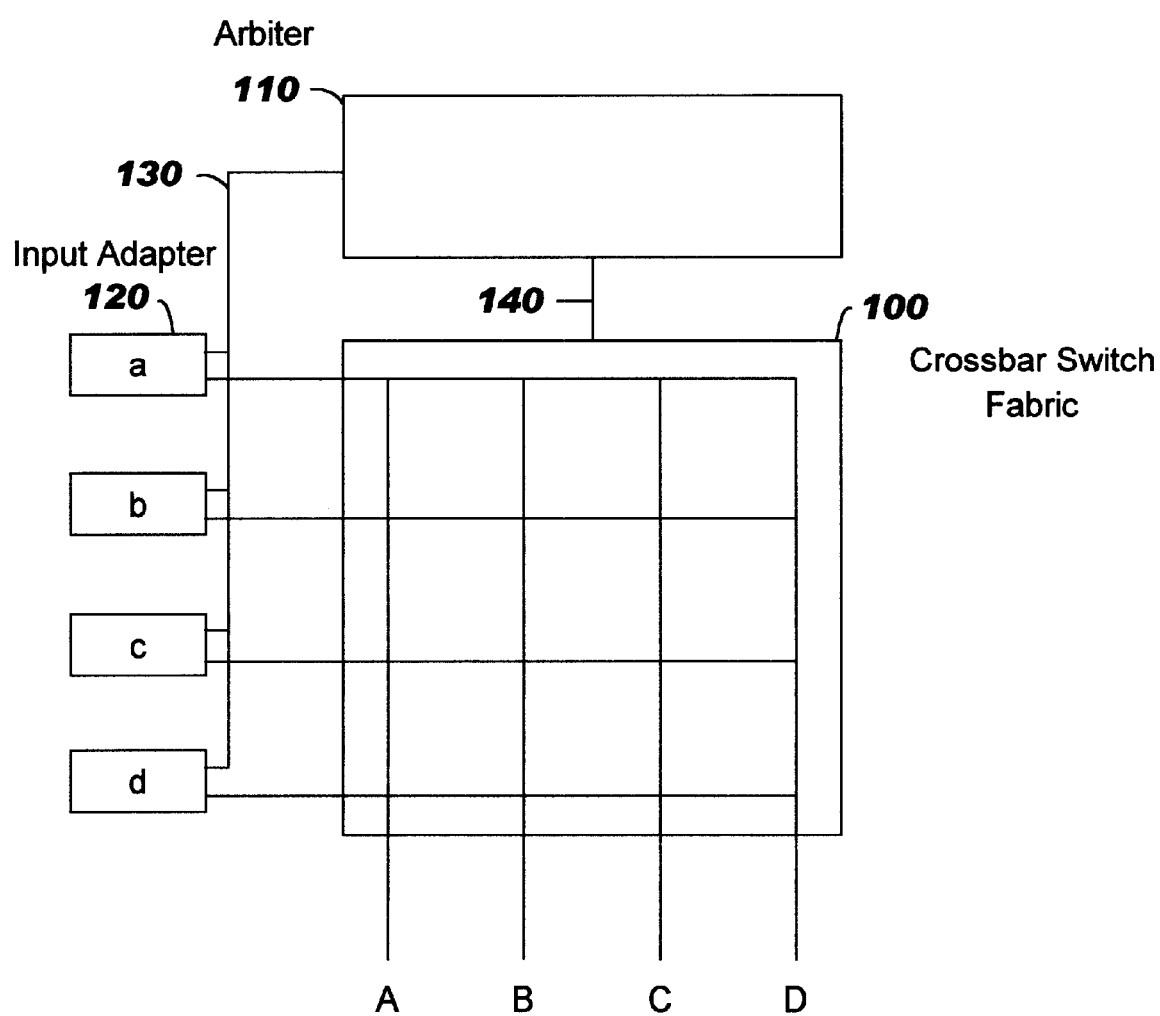
FIG. 1 is a schematic diagram showing a packet switch.

FIG. 1 is a schematic diagram showing a packet switch having four inputs denoted a, b, c, d and four outputs, A, B, C, D. It will be clear to those skilled in the art how the apparatus to be described below may be modified to accommodate different numbers of inputs and outputs.

The switch includes a crossbar switch fabric 100 through which data packets can be transmitted between any one of the inputs and any one of the outputs. An input adapter 120 is provided at each input which includes an input queue mechanism, which will be described in more detail below, for temporarily storing data packets whilst they are waiting to be transmitted through switch fabric 100. It will be understood that outputs A,B,C, and D are connected to output adapters (not shown).

The general operation of the crossbar switch and the transfer of data packets from input adapters 120 to the outputs does not form part of the invention and will not be described in detail herein. It will be appreciated that in practical embodiments, switch fabric 100 may be connected to a plurality of adapters which each include the functionality of the input and output adapters referred to above and are capable of both transmitting and receiving data packets via the switch fabric.

To reduce control overheads in the application of such a switch to ATM, the data packets preferably include entire 53-byte ATM cells, together with appropriate internal routing and control information. However, it will be understood that other sizes are possible for the data packets, such as fixed size portions of ATM cells, eg 4, 8 or 16 byte bursts. In this event, the division of the cells into bursts and the reassembly of the bursts could be handled in known fashion in the input and output adapters respectively.

An arbiter 110 is provided for controlling crossbar switch fabric 100 via control lines 130 and 140 so as to repeatedly select that subset of input-output combinations which maximises the utilization of the output ports, with the constraint inherent in a crossbar switch that at any time each input can only be connected with one output and each output can only be connected to one input.

As is known in the art, arbitration cycles are overlapped with data transfer cycles so that during one arbitration cycle, the switch fabric 100 switches packets in accordance with selections made during the previous arbitration cycle and at the end of each arbitration cycle the next set of input-output connection selections have been generated ready for corresponding data transfers during the next arbitration cycle.

Figure 2:
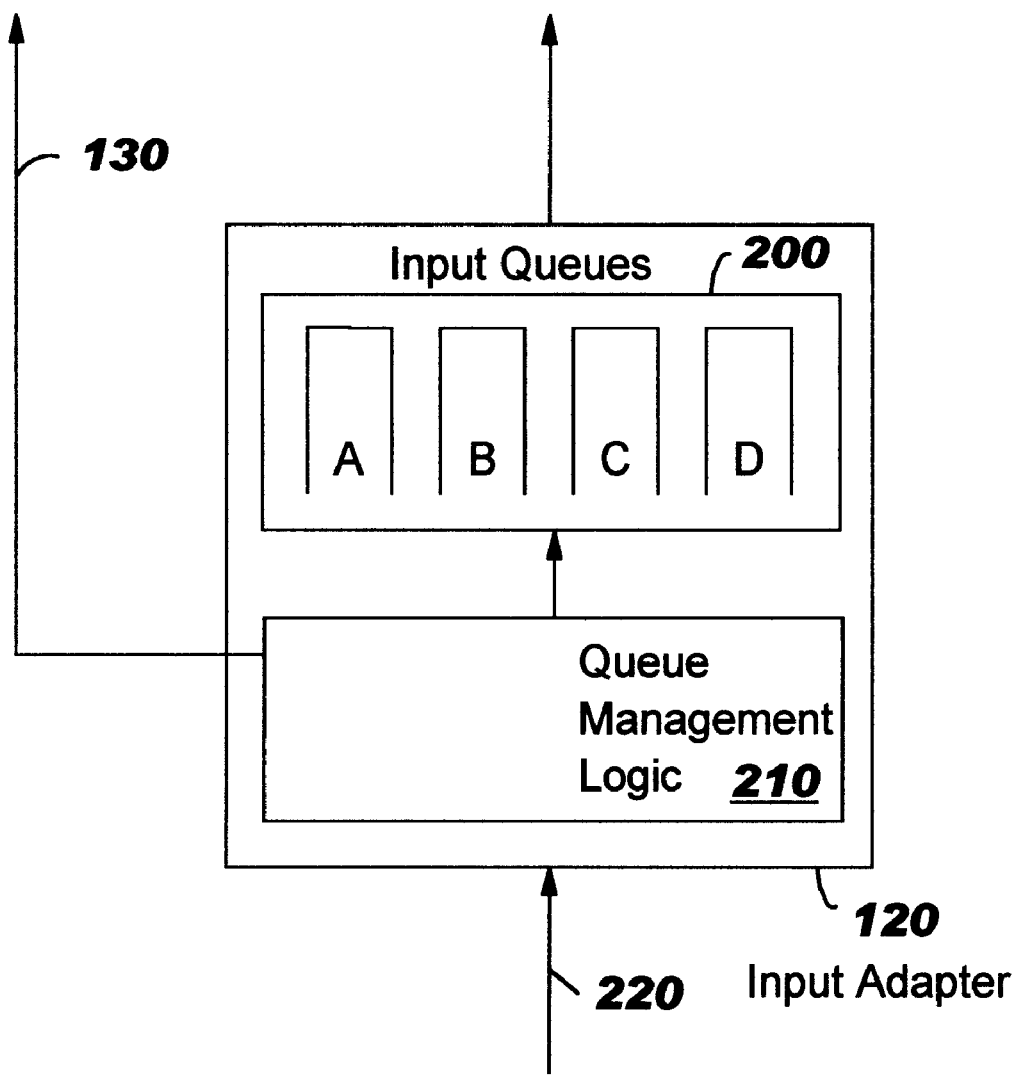
FIG. 2 shows one of the input adapters of the switch.

FIG. 2 shows in more detail the main features of input adapters 120. Input adapters 120 all include a set of input queues 200, together with suitable data handling and queue management logic 210. One input queue is provided for each go output A, B, C, D. Logic 210 accepts data packets on input 220 and passes them to the appropriate queue according to their output routing. Logic 210 is arranged to detect whether or not each of the queues A B C D is ic occupied and communicate the queue status over line 130 to arbiter 110.

Figure 3:
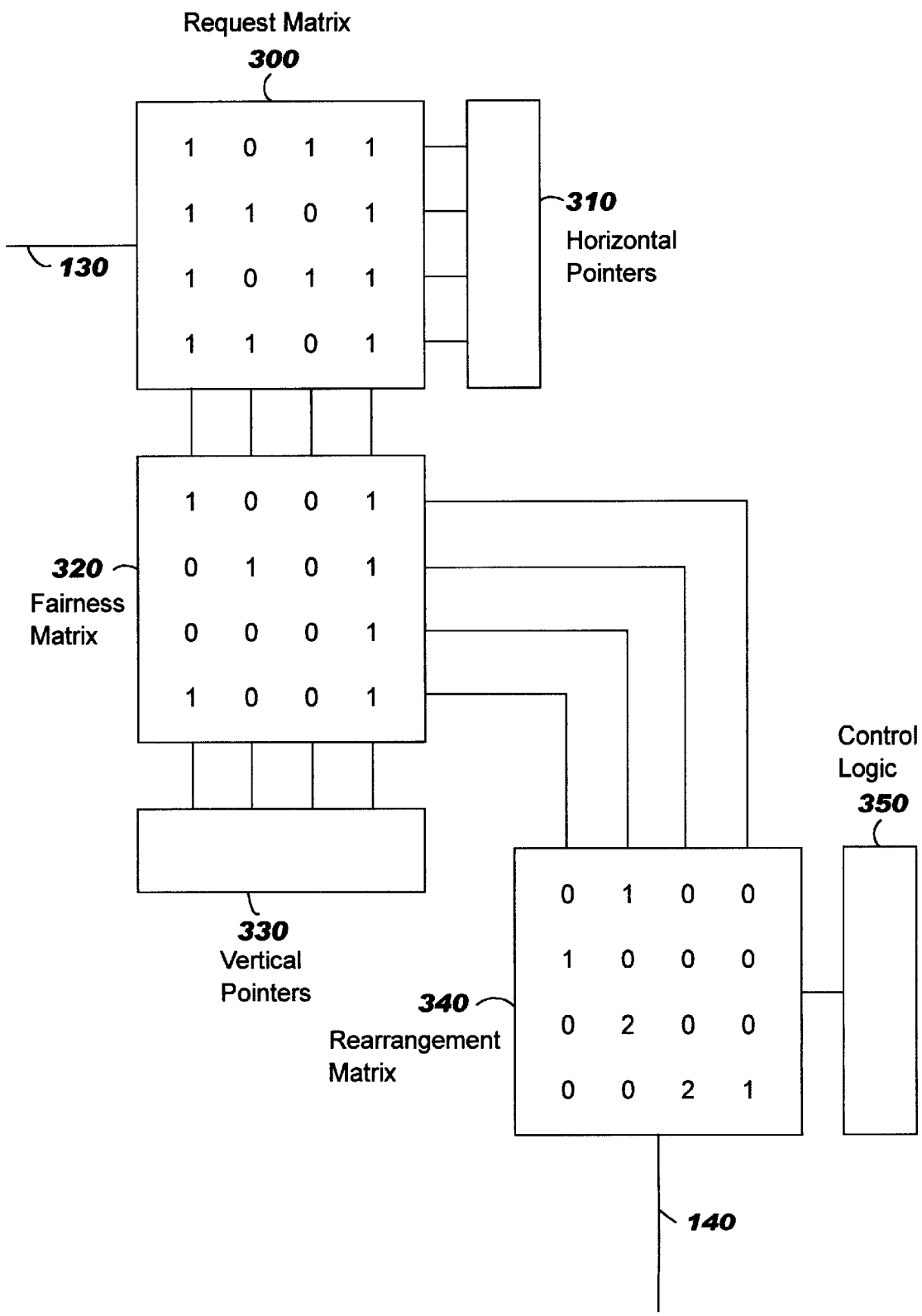
FIG. 3 shows the arbiter of the switch.

FIG. 3 is a schematic diagram showing arbiter 110. The state of each input queue in each adapter is recorded in a request matrix 300. Request matrix 300 is a binary matrix in which each input adapter is represented by a matrix row and each output queue within each input adapter is represented by a column location in the row. Each matrix element therefore represents a possible input-output routing. In the following, the matrix elements will be referred to by the input-output combinations they represent. For example, the connection from input b to output C will be referred to as the element or connection b-C.

The status of each queue is received on line 130 and request matrix 300 is updated accordingly. In this example, if a queue is not empty, a one is recorded in the relevent row/column location in request matrix 300 and a zero is recorded if the queue is empty. The binary ones in request matrix 300 thus act as tokens representing requests for an input-output connection within switch fabric 100.

A set of horizontal pointers 310 are provided which each point to a column location in each row of request matrix 300. Pointers 310 act to select one request from each row. The selected requests are communicated to a fairness matrix 320 via suitable logic gates and recorded therein. Fairness matrix 320 is a binary matrix with the same structure as request matrix 300.

The tokens transferred from request matrix 300 to fairness matrix 320 are deleted from request matrix 120 by setting the corresponding matrix elements to zero.

A set of vertical pointers 330 are provided which point to a row location in each column of fairness matrix 320. Pointers 330 act to select one request from each column. The selected requests, ie those which have been selected both in the request matrix 300 and fairness matrix 320, are communicated and recorded in rearrangement matrix 340. The selected requests are then deleted in fairness matrix 320, ie the relevant row/column location is set to zero.

Each horizontal and each vertical pointer is incremented on each cycle so as to point to the next eligible location in the respective row or column of the request and fairness matrices respectively. To be eligible for selection, a location must be occupied by a token and the corresponding location in the matrix to which the token is to be transferred must be unoccupied.

This double round robin selection via the request and fairness matrices ensures that each input-output combination does not have to wait for more than four cycles before being served, irrespective of what traffic is competing for the same input or output line. However, it is still possible that there may be input or output conflicts between requests selected in the fairness matrix.

In detail, the algorithm employed is as follows:
1. Horizontal pointers 310 are incremented to point to the next occupied row location in request matrix 300, for which the corresponding location in fairness matrix 320 is unoccupied.
2. Tokens at locations pointed to by horizontal pointers 310 are gated from request matrix 300 to fairness matrix 320.
3. Vertical pointers 330 are incremented to point to the next occupied column location in fairness matrix 320 for which the corresponding location in rearrangement matrix 340 is unoccupied.
4. Gated tokens from request matrix 300 are deleted.
5. Tokens at locations pointed to by vertical pointers 330 are gated from fairness matrix 320 to rearrangement matrix 340.
6. Gated tokens from fairness matrix 320 are deleted.

It will be appreciated that the role of the horizontal and vertical pointers may be reversed without substantially affecting the operation or effect of the algorithm.

Figure 4:
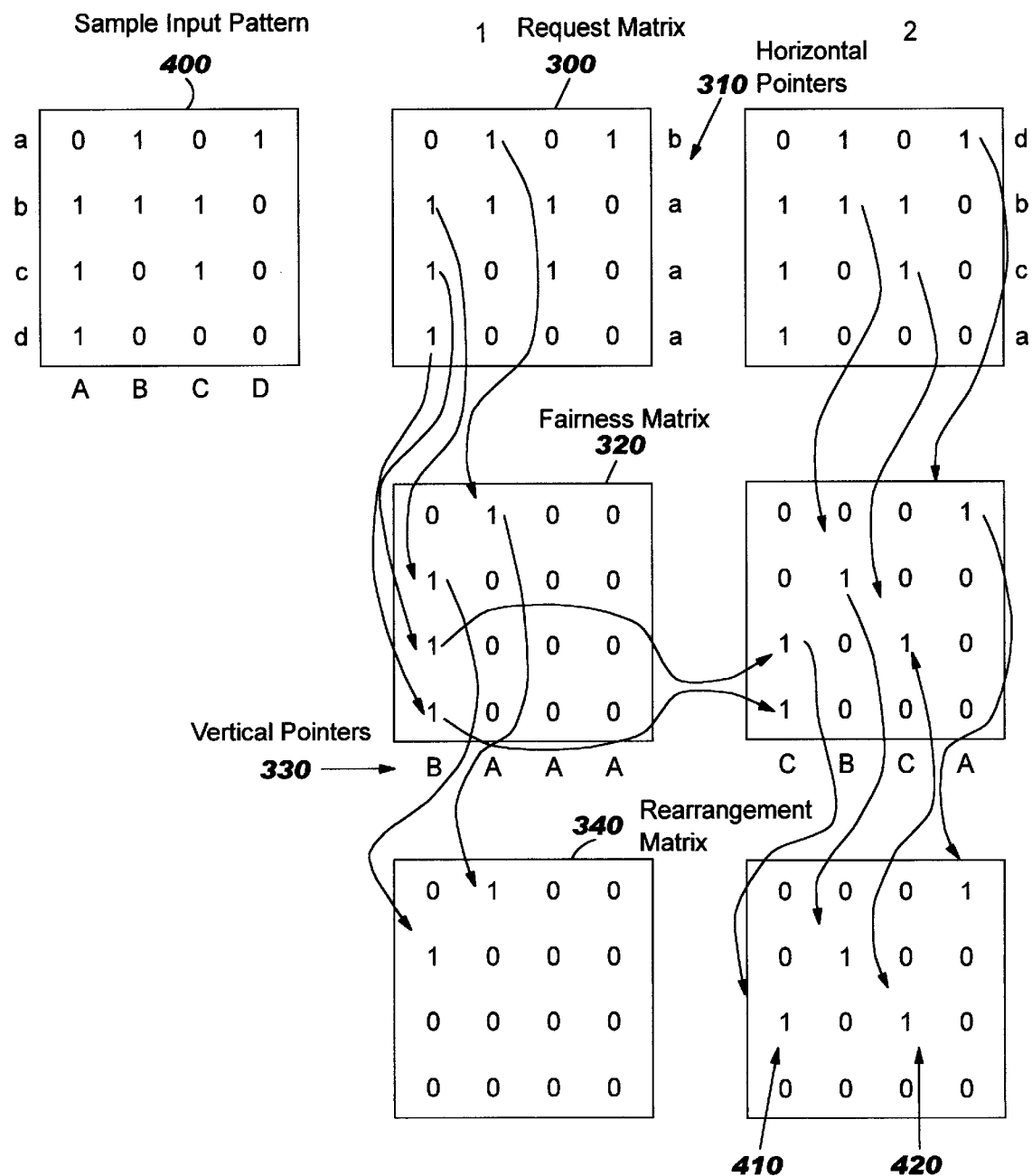

The operation of this double round robin selection is illustrated in FIG. 4 for the sample input pattern indicated at 400. In the first iteration, indicated by the middle column the horizontal pointers 310 point to inputs b, a, a, a respectively. The corresponding tokens in request matrix 300 are transferred to matrix 320 as indicated by the arrows in FIG. 4. The vertical pointers 330 point to outputs B A A A. Consequently, the tokens from the first two rows of matrix 320 are transferred to rearrangement matrix 340. The tokens from the lower two rows of matrix 320 remain in matrix 320 for the next iteration.

In the first iteration, there is no contention between the input-output combinations represented by the two tokens transferred to the rearrangement matrix 340. Therefore, these request can both be satisfied and the tokens deleted.

In the second iteration, the input pointers are incremented to point to d, b, c, a respectively. Tokens from the first three rows are transferred to matrix 320. The output pointers are incremented to point to C, B, C, A respectively and corresponding tokens are transferred to matrix 340.

In the second iteration, there is a conflict between requests in rearrangement matrix 340 since there is a request for a connection c-A indicated at 410 as well as a connection c-C indicated at 420. This contention is resolved as described below.

Rearrangement matrix 340 has the same structure as first and second fairness matrices, except that at each row-column location is recorded an integer age value which is incremented with each cycle of a selection algorithm to be described below. The age value records the length of time each request has remained in rearrangement matrix 340.

Control logic 350 is provided which operates on rearrangement matrix 340 to select a set of at most four requests from rearrangement matrix 340 using the following algorithm:
1. The row is chosen which has the lowest number of requests.
2. The request with the greatest weight is selected within that row.
3. The row and column of the selected request are inhibited in further selections.
4. Steps 1 to 3 are repeated until all possible selections have been made.
5. The selected requests are communicated to switch 100 via line 140 and deleted from rearrangement matrix 340.
6. The weight associated with each request remaining in matrix 340 is incremented.

This algorithm is illustrated in FIG. 5. FIG. 5 illustrates the age values stored in rearrangement matrix 340 in four steps of the above algorithm.

In step 1, row 2 is selected since it has the least number of requests. The request for a connection b-B is selected as indicated in bold. In step 2, row 1 is selected since it has the least number of eligible requests, column 2 having been inhibited. The request for a connection a-A is selected as indicated in bold. In step 3, row 4 is selected since it has the least number of eligible requests, column 1 having been inhibited. The request for a connection d-D is selected as indicated in bold. In step 4, row 3 is selected as the only row remaining. The request for a connection c-C is selected as indicated in bold.

The above selections from the request, fairness and rearrangement matrices are carried out repeatedly in each arbitration cycle so that the results of the selection from rearrangement matrix 340 are available at the end of the arbitration cycle.

It will be appreciated that many other priority schemes would be possible within the rearranger, include starting with the request with the greatest age or ordering by cell time. An important factor in the choice of such a scheme is that it must guarantee that a request cannot remain indefinitely in rearrangement matrix 340, consequently the algorithm must ensure that each request has a high probability of being eventually selected.

Nevertheless tha algorithm described above has been found to be particularly effective since the initial selection of the row with the fewest requests reduces the probability that the request selected within that row blocks the selection of other requests in the matrix.

While the invention has been described in terms of preferred embodiments, those skilled in the art will recognize that the invention can be practiced with modification within the spirit and scope of the appended claims.

Having thus presented our invention, what we claim as new and desire to secure by Letters Patent is as follows:

1. An arbiter for arbitrating requests by a plurality of first data processing units for access to a plurality of second data processing units interconnected by a switching system of a type in which at any time each first unit can only access one second unit and each second unit can only be accessed by one first unit, the arbiter comprising:

a scheduler mechanism for repeatedly selecting access requests with a defined minimum probability of selecting a request for each first unit-second unit combination;

rearrangement storage means for recording requests selected by the scheduler mechanism;

a rearranger for repeatedly selecting a set of requests recorded in the rearrangment storage means, so that only one request per first unit and per second unit is selected, using a priority mechanism which increases the probability of selection with the length of time a request is stored in the rearrangement storage means;

means for communicating the grant of the selected set of requests to the switching system;

means for deleting the selected set of requests from the rearrangment storage means.

2. An arbiter as claimed in claim 1 wherein the scheduler mechanism comprises a plurality of first schedulers, one for each first unit, for repeatedly selecting one request for access by the respective first unit with a defined minimum probability of selecting a request from that first unit to access each second unit;

a plurality of second schedulers, one for each second unit, for repeatedly selecting one of the requests for access to the respective second unit with a defined minimum probability of selecting a request from each first unit to access that second unit, wherein requests selected by both one of the first schedulers and one of the second schedulers are recorded in the rearrangment storage means.

3. An arbiter as claimed in claim 2 comprising fairness storage means for recording the request selected by one of the first or second schedulers and wherein the other of the second or first schedulers, as the case may be, are arranged to select requests from among those stored in the fairness storage means.

4. An arbiter as claimed in claim 2 or claim 3 wherein the first schedulers and/or the second scheduler use a rotating priority.

5. An arbiter as claimed in claim 4 in which an age indicator associated with each request is stored with the request in the rearrangement storage means and wherein the priority mechanism in the rearranger is based at least in part on the age indicator.

6. An arbiter as claimed in claim 4 wherein the priority mechanism in the rearranger selects requests according to the number of requests recorded in the rearrangement storage means for each first or second data processing unit.

7. A method for arbitrating requests by a plurality of first data processing units for access to a plurality of second data processing units interconnected by a switching system of a type in which at any time each first unit can only access one second unit and each second unit can only be accessed by one first unit, the method comprising repeatedly:

selecting access requests with a defined minimum probability of selecting a request for each first unit-second unit combination;

recording the selected requests in rearrangement storage means;

selecting a set of requests recorded in the rearrangement storage means, so that only one request per first unit and per second unit is selected, using a priority mechanism which increases the probability of selection with the length of time a request is stored in the rearrangement storage means;

communicating the grant of the selected set of requests to the switching system;

deleting the selected set of requests from the rearrangement storage means.

* * * * *